(12) United States Patent
Ives et al.

(10) Patent No.: US 9,284,709 B2
(45) Date of Patent: Mar. 15, 2016

(54) METHOD OF INSTALLING A HYDROELECTRIC TURBINE

(75) Inventors: James Ives, Dublin (IE); Paul Dunne, Dublin (IE)

(73) Assignee: OpenHydro Group Limited, Dublin (IE)

( * ) Notice: Subject to any disclaimer, the term of this patent is extended or adjusted under 35 U.S.C. 154(b) by 17 days.

(21) Appl. No.: 12/595,026

(22) PCT Filed: Apr. 11, 2008

(86) PCT No.: PCT/EP2008/002870
§ 371 (c)(1),
(2), (4) Date: Feb. 26, 2010

(87) PCT Pub. No.: WO2008/125286
PCT Pub. Date: Oct. 23, 2008

(65) Prior Publication Data
US 2010/0232885 A1    Sep. 16, 2010

(30) Foreign Application Priority Data

Apr. 11, 2007   (EP) .................................... 07007403

(51) Int. Cl.
| | |
|---|---|
| *E02D 35/00* | (2006.01) |
| *E02D 15/08* | (2006.01) |
| *F03B 13/26* | (2006.01) |
| *F03B 17/06* | (2006.01) |
| *E02B 17/00* | (2006.01) |

(52) U.S. Cl.
CPC .............. *E02D 15/08* (2013.01); *F03B 13/264* (2013.01); *F03B 17/061* (2013.01); *E02B 2017/0091* (2013.01); *F05B 2260/02* (2013.01); *Y02E 10/28* (2013.01)

(58) Field of Classification Search
USPC ........ 405/195.1, 203, 206, 209; 114/258–260
See application file for complete search history.

(56) References Cited

U.S. PATENT DOCUMENTS

| | | |
|---|---|---|
| 228,467 A | 6/1880 | Maclay |
| 928,536 A | 7/1909 | Pino |
| 1,710,103 A | 4/1929 | Nelson |
| 2,054,142 A | 9/1936 | Sharp |
| 2,470,797 A | 5/1949 | Thomas |
| 2,501,696 A | 3/1950 | Souczek |

(Continued)

FOREIGN PATENT DOCUMENTS

| | | |
|---|---|---|
| CA | 2388513 | 8/2000 |
| CA | 2352673 | 1/2003 |

(Continued)

OTHER PUBLICATIONS

U.S. Appl. No. 13/133,235, filed Jun. 7, 2011, including the specification, claims and drawings.

(Continued)

*Primary Examiner* — Sean Andrish
(74) *Attorney, Agent, or Firm* — Gardner, Linn, Burkhart & Flory, LLP

(57) ABSTRACT

The present invention provides a method for installing a hydroelectric turbine at a deployment site on the seabed which involves lowering the turbine and associated base onto the seabed from a vessel using a number of lines, and once on the seabed using these lines to tether the vessel to the base/turbine while telemetry from the base/turbine is analyzed.

12 Claims, 3 Drawing Sheets

(56) References Cited

U.S. PATENT DOCUMENTS

| | | |
|---|---|---|
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |
| 2,874,547 A | 2/1959 | Fiore |
| 3,078,680 A | 2/1963 | Wapsala |
| 3,209,156 A | 9/1965 | Struble, Jr. |
| 3,292,023 A | 12/1966 | Korber |
| 3,342,444 A | 9/1967 | Nelson |
| 3,355,998 A | 12/1967 | Roemisch |
| 3,384,787 A | 5/1968 | Schwartz |
| 3,422,275 A | 1/1969 | Braikevitch et al. |
| 3,433,024 A | 3/1969 | Diamond et al. |
| 3,477,236 A | 11/1969 | Burrus |
| 3,487,805 A | 1/1970 | Satterthwaite et al. |
| 3,708,251 A | 1/1973 | Pierro |
| 3,986,787 A | 10/1976 | Mouton, Jr. et al. |
| 3,987,638 A * | 10/1976 | Burkhardt et al. ............ 405/203 |
| 4,095,918 A | 6/1978 | Mouton et al. |
| 4,163,904 A | 8/1979 | Skendrovic |
| 4,219,303 A | 8/1980 | Mouton, Jr. et al. |
| 4,274,009 A | 6/1981 | Parker, Sr. |
| 4,367,413 A | 1/1983 | Nair |
| 4,421,990 A | 12/1983 | Heuss et al. |
| 4,427,897 A | 1/1984 | Migliori |
| 4,523,878 A | 6/1985 | Richart et al. |
| 4,541,367 A | 9/1985 | Lindberg |
| 4,613,762 A | 9/1986 | Soderholm |
| 4,720,640 A | 1/1988 | Anderson et al. |
| 4,740,711 A | 4/1988 | Sato et al. |
| 4,744,697 A | 5/1988 | Coppens |
| 4,744,698 A | 5/1988 | Dallimer et al. |
| 4,810,135 A | 3/1989 | Davenport et al. |
| 4,867,605 A | 9/1989 | Myers et al. |
| 4,868,408 A | 9/1989 | Hesh |
| 4,868,970 A | 9/1989 | Schultz et al. |
| 4,990,810 A | 2/1991 | Newhouse |
| 5,592,816 A | 1/1997 | Williams |
| 5,606,791 A | 3/1997 | Fougere et al. |
| 5,609,441 A | 3/1997 | Khachaturian |
| 5,656,880 A | 8/1997 | Clark |
| 5,662,434 A | 9/1997 | Khachaturian |
| 5,715,590 A | 2/1998 | Fougere et al. |
| 5,800,093 A | 9/1998 | Khachaturian |
| 5,998,905 A | 12/1999 | Fougere et al. |
| 6,039,506 A | 3/2000 | Khachaturian |
| 6,109,863 A | 8/2000 | Milliken |
| 6,113,314 A | 9/2000 | Campbell |
| 6,166,472 A | 12/2000 | Pinkerton |
| 6,168,373 B1 | 1/2001 | Vauthier |
| 6,232,681 B1 | 5/2001 | Johnston et al. |
| 6,242,840 B1 | 6/2001 | Denk et al. |
| 6,293,734 B1 | 9/2001 | Thomas et al. |
| 6,300,689 B1 | 10/2001 | Smalser |
| 6,367,399 B1 | 4/2002 | Khachaturian |
| 6,406,251 B1 | 6/2002 | Vauthier |
| 6,409,466 B1 | 6/2002 | Lamont |
| 6,445,099 B1 | 9/2002 | Roseman |
| 6,476,709 B1 | 11/2002 | Wuidart et al. |
| 6,612,781 B1 | 9/2003 | Jackson |
| 6,648,589 B2 | 11/2003 | Williams |
| RE38,336 E | 12/2003 | Williams |
| 6,729,840 B2 | 5/2004 | Williams |
| 6,756,695 B2 | 6/2004 | Hibbs et al. |
| 6,770,987 B1 | 8/2004 | Sogard et al. |
| 6,777,851 B2 | 8/2004 | Maslov |
| 6,806,586 B2 | 10/2004 | Wobben |
| 6,840,713 B1 | 1/2005 | Schia et al. |
| 6,843,191 B1 | 1/2005 | Makotinsky |
| 6,857,821 B2 | 2/2005 | Steenhuis et al. |
| 6,957,947 B2 | 10/2005 | Williams |
| 7,190,087 B2 | 3/2007 | Williams |
| D543,495 S | 5/2007 | Williams |
| 7,275,891 B2 | 10/2007 | Owen et al. |
| 7,352,078 B2 | 4/2008 | Gehring |
| 7,378,750 B2 | 5/2008 | Williams |
| 7,425,772 B2 | 9/2008 | Novo Vidal |
| 7,471,009 B2 | 12/2008 | Davis et al. |
| 7,527,006 B2 | 5/2009 | Khachaturian |
| 7,611,307 B2 | 11/2009 | Owen et al. |
| 7,845,296 B1 | 12/2010 | Khachaturian |
| 7,874,788 B2 | 1/2011 | Stothers et al. |
| 7,976,245 B2 | 7/2011 | Finnigan |
| 2002/0034437 A1 | 3/2002 | Williams |
| 2002/0062644 A1 | 5/2002 | Rosefsky |
| 2002/0088222 A1 | 7/2002 | Vauthier |
| 2003/0044272 A1 | 3/2003 | Addie et al. |
| 2003/0137149 A1 | 7/2003 | Northrup et al. |
| 2003/0168864 A1 | 9/2003 | Heronemus et al. |
| 2003/0193198 A1 | 10/2003 | Wobben |
| 2003/0218338 A1 | 11/2003 | O'Sullivan et al. |
| 2004/0021437 A1 | 2/2004 | Maslov et al. |
| 2004/0201299 A1 | 10/2004 | Naritomi et al. |
| 2004/0227500 A1 | 11/2004 | O'Meara |
| 2004/0232792 A1 | 11/2004 | Erfourth |
| 2004/0262926 A1 * | 12/2004 | Hansen ........................... 290/44 |
| 2005/0005592 A1 | 1/2005 | Fielder |
| 2005/0031442 A1 | 2/2005 | Williams |
| 2006/0261597 A1 | 11/2006 | Gehring |
| 2007/0018459 A1 | 1/2007 | Williams |
| 2007/0063448 A1 | 3/2007 | Kowalczyk |
| 2007/0231072 A1 | 10/2007 | Jennings et al. |
| 2007/0291426 A1 | 12/2007 | Kasunich et al. |
| 2008/0012538 A1 | 1/2008 | Stewart et al. |
| 2009/0162144 A1 | 6/2009 | Ayre |
| 2009/0278357 A1 | 11/2009 | Williams |
| 2010/0025998 A1 | 2/2010 | Williams |
| 2010/0026002 A1 | 2/2010 | Spooner |
| 2010/0068037 A1 | 3/2010 | Ives |
| 2010/0172698 A1 | 7/2010 | Ives et al. |
| 2010/0183377 A1 * | 7/2010 | Fraenkel ....................... 405/232 |
| 2010/0201129 A1 | 8/2010 | Holstein et al. |
| 2010/0295388 A1 | 11/2010 | Ives et al. |
| 2011/0018274 A1 | 1/2011 | Ives et al. |
| 2011/0088253 A1 | 4/2011 | Ives et al. |
| 2011/0110770 A1 | 5/2011 | Spooner et al. |
| 2011/0305518 A1 | 12/2011 | Pearce et al. |
| 2012/0175877 A1 | 7/2012 | Ives et al. |
| 2012/0187680 A1 | 7/2012 | Spooner et al. |
| 2012/0235412 A1 | 9/2012 | Dunne et al. |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 A1 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |

(56) References Cited

FOREIGN PATENT DOCUMENTS

| | | |
|---|---|---|
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | 9844372 | 10/1998 |
| WO | WO9844372 | 10/1998 |
| WO | 9852819 | 11/1998 |
| WO | WO9852819 | 11/1998 |
| WO | 9966623 | 12/1999 |
| WO | WO9966623 | 12/1999 |
| WO | 0077393 | 12/2000 |
| WO | WO0077393 | 12/2000 |
| WO | 0134973 | 5/2001 |
| WO | 0134977 | 5/2001 |
| WO | WO0134973 | 5/2001 |
| WO | WO0134977 | 5/2001 |
| WO | 02099950 | 12/2002 |
| WO | WO02099950 | 12/2002 |
| WO | 03014561 | 2/2003 |
| WO | WO03014561 | 2/2003 |
| WO | 03025385 | 3/2003 |
| WO | WO03025385 | 3/2003 |
| WO | WO03/046375 | 6/2003 |
| WO | 2004015264 | 2/2004 |
| WO | WO2004015264 | 2/2004 |
| WO | 2004027257 | 4/2004 |
| WO | WO2004027257 | 4/2004 |
| WO | 2004107549 | 12/2004 |
| WO | 2004113717 | 12/2004 |
| WO | WO2004107549 | 12/2004 |
| WO | WO2004113717 | 12/2004 |
| WO | 2005045243 | 5/2005 |
| WO | WO2005045243 | 5/2005 |
| WO | 2005061887 | 7/2005 |
| WO | 2005078233 | 8/2005 |
| WO | WO2005078233 | 8/2005 |
| WO | 2005080789 | 9/2005 |
| WO | WO2005080789 | 9/2005 |
| WO | 2005116443 | 12/2005 |
| WO | WO2005116443 | 12/2005 |
| WO | 2006029496 | 3/2006 |
| WO | WO2006029496 | 3/2006 |
| WO | 2007043894 | 4/2007 |
| WO | WO2007043894 | 4/2007 |
| WO | 2007055585 | 5/2007 |
| WO | WO2007055585 | 5/2007 |
| WO | 2007083105 | 7/2007 |
| WO | WO2007083105 | 7/2007 |
| WO | 2007086814 | 8/2007 |
| WO | WO2007086814 | 8/2007 |
| WO | 2007125349 | 11/2007 |
| WO | WO2007125349 | 11/2007 |
| WO | 2008004877 | 1/2008 |
| WO | 2008006614 | 1/2008 |
| WO | WO2008004877 | 1/2008 |
| WO | WO2008006614 | 1/2008 |
| WO | 2008050149 | 5/2008 |
| WO | WO2008050149 | 5/2008 |
| WO | 2008081187 | 7/2008 |
| WO | WO2008081187 | 7/2008 |
| WO | WO2010118766 | 10/2010 |
| WO | WO2011039249 | 4/2011 |
| WO | WO2011039255 | 4/2011 |
| WO | WO2011039267 | 7/2011 |

OTHER PUBLICATIONS

U.S. Appl. No. 13/133,805, filed Jun. 9, 2011, including the specification, claims and drawings.
U.S. Appl. No. 13/133,504, filed Jun. 8, 2011, including the specification, claims and drawings.
U.S. Appl. No. 13/133,507, filed Jun. 8, 2011, including the specification, claims and drawings.
U.S. Appl. No. 13/133,832, filed Jun. 9, 2011, including the specification, claims and drawings.
U.S. Appl. No. 13/264,667, filed Oct. 14, 2011, including specification, claims and drawings.
PCT International Search Report for International Application No. PCT/EP2008/002870, dated Feb. 7, 2008.
PCT Written Opinion of International Searching Authority (Feb. 7, 2008).
PCT Request for Processing of International Application (Apr. 11, 2008).

* cited by examiner

METHOD OF INSTALLING A HYDROELECTRIC TURBINE

FIELD OF THE INVENTION

The present invention is concerned with a method of installing a hydroelectric turbine onto the seabed, and in particular a method which enables the hydroelectric turbine to be pre-installed on a base prior to the installation, thereby greatly simplifying the installation process.

BACKGROUND OF THE INVENTION

Due to the environmental damage which has been inflicted on the planet as a result of the burning of fossil fuels, renewable energy has finally begun to be given significant attention, with many projects being developed around solar energy, wind energy, and tidal power. Of these alternative forms of energy, tidal power is arguably the most attractive, given that tidal flows are entirely predictable and constant, unlike wind or solar energy which are relatively intermittent and therefore less dependable.

However, harnessing tidal energy does provide its own challenges, in particular with respect to the installation and maintenance of tidal power generators, for example hydroelectric turbines, which by the very nature of the operation of same must be located in relatively fast flowing tidal currents, and more than likely located on the seabed. In addition, in order to be economically viable these turbines must be built on a large scale. As a result the turbines and associated bases/supports are large and cumbersome components, and require significant heavy lifting and transport equipment in order to achieve deployment. The use of such heavy lifting equipment is normally a hazardous undertaking, and is rendered even more dangerous when this equipment is operated at sea under difficult and unsteady conditions. In addition, most installations of such tidal generating equipment consists of the fixing of one or more piles into the seabed as a first phase of the installation, and then as a second phase installing one or more turbines onto the pile(s). The sinking of a pile into the seabed in an area of high tidal flow is considerably problematic and generally a dangerous operation. In addition, significant drilling and piling equipment must be transported to and operated at the site of installation, significantly increasing the complexity and cost of the operation.

The installation process is further complicated by an increasing shortage in the market of suitable vessels and equipment to perform such drilling work and the extreme danger of engaging divers in high tidal flow sites.

As mentioned above, working at sea with such large and heavy equipment is a dangerous and time consuming operation, and anything that can be done to simplify this task and/or decrease the time taken is of great benefit.

The present invention has therefore been developed with a view to simplifying the installation of hydroelectric turbines, which method allows the installation of a hydroelectric turbine which has been pre-installed on a base.

SUMMARY OF THE INVENTION

The present invention provides a method of installing a base and a hydroelectric turbine onto the seabed, the method comprising the steps of:
connecting the turbine to the base;
transporting the base and turbine to a deployment site by a deployment vessel;
lowering the base onto the seabed from the vessel;
keeping the vessel tethered to the base;
establishing the suitability of the installation; and
disconnecting the vessel from the base.

Preferably, the method comprises lowering the base by means of a number of lowering lines fed from the deployment vessel.

Preferably, the method comprises the step of feeding slack into the lowering lines once the base is located on the seabed.

Preferably, the method comprises lowering the base onto the seabed in flowing water.

Preferably, the method comprises lowering the base onto the seabed in a tidal stream, an ocean current or a running river.

Preferably, the method comprises the step of substantially maintaining the position of the deployment vessel against the flowing water.

Preferably, the method comprises the step of receiving telemetry from the base and/or turbine prior to the final positioning on the seabed.

Preferably, the method comprises, in the transporting step, towing the deployment vessel to the deployment site.

Preferably, the method comprises the step of slackening a tow-line between the towing vessel and the deployment vessel following slackening of lowering lines between the vessel and the base.

Preferably, the method comprises, in the step of establishing the suitability of the installation, receiving telemetry from the base and/or turbine when on the seabed.

Preferably, the method comprises, in the lowering step, lowering the base from directly beneath the vessel.

Preferably, the method comprises the step of tethering the base to an anchor upstream of the deployment site prior to lowering the base from the vessel.

Preferably, the method comprises the further step of at least partially raising the base off the seabed and repositioning same prior to disconnecting the vessel from the base.

As used herein, the term "seabed" is intended to mean the seabed in addition to the base or bottom of any suitable body of water such as a riverbed or the like.

DETAILED DESCRIPTION OF THE DRAWINGS

Figure 1:
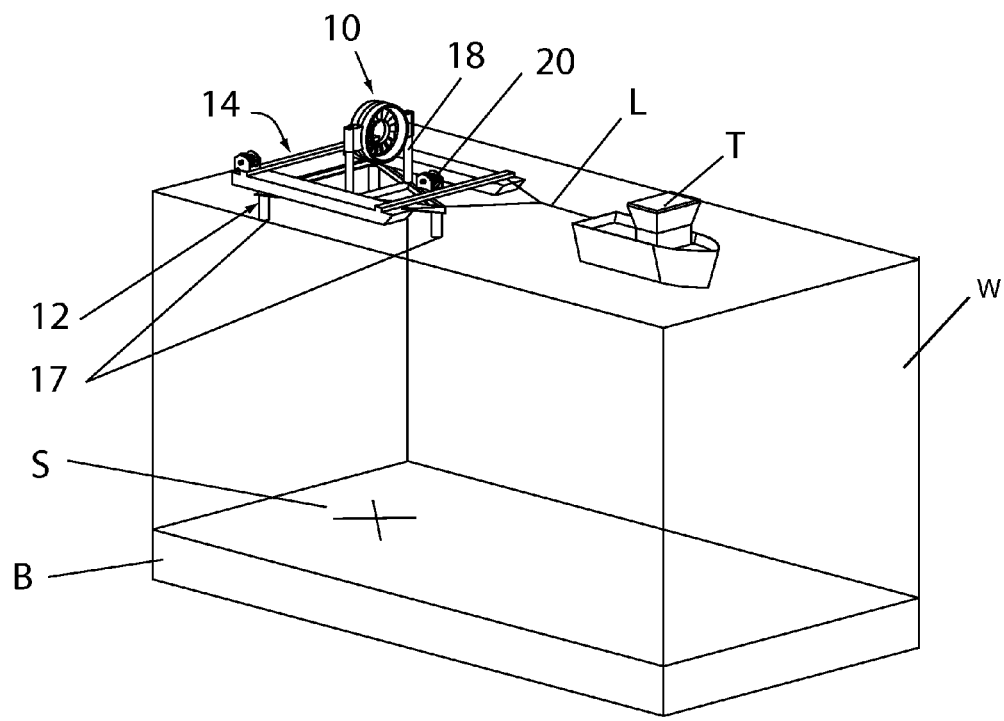
FIG. 1 illustrates a schematic illustration of a deployment vessel carrying a base and turbine thereon, having been towed to a deployment site.

Referring now to the accompanying drawings, there is described and shown a method of installing a hydroelectric turbine 10 and associated base 12 onto the seabed B at a deployment site S beneath a body of water W. In the embodiment illustrated, a deployment vessel 14 is utilised to transport the turbine 10 and base 12 to a deployment site S. In this preferred embodiment, the vessel 14 does not have its own means of propulsion and thus a tug T is used to tow the vessel 14 to the deployment site S. It will, however, be appreciated that the vessel 14 could be provided with propulsion means, such as an inboard or outboard motor(s) or the like (not shown) and in such a situation the use of the tug T could be omitted. The use of the tug T is therefore not an essential element of the method of the invention. In addition, although the turbine 10, base 12 and vessel 14 are each shown as a particular design or configuration it is to be understood that these are merely examples and not essential to the method of installation of the invention.

Prior to proceeding to the deployment site S, the vessel 14 is preferably towed to a relatively sheltered location such as a nearby bay or the like, in order to await the correct tidal conditions for deployment of the turbine 10. The preferred tidal velocity for deployment is a falling tide, although it will be appreciated that these conditions are not essential to the method of deployment and merely provide the ideal working conditions for the method of installation of the invention. One of the benefits of deployment during a falling tide, as will become apparent from the following description, is in providing time for the turbine 10 and base 12 to be returned to the surface during "slack water" if the installation is to be aborted. In addition a falling tide tends to keep the vessel 14 in the correct orientation facing into the tide such that the turbine 10, when lowered to the seabed B, is also facing into the tide to achieve maximum operating efficiency.

Once the preferred tidal conditions are present, the vessel 14 is towed over the deployment site S. At this point, the tug T is faced into the falling tide F and the speed of the tug T is matched as closely as possible to the speed of the tide, in order to maintain the position of the vessel 14 over the site S. The turbine 10 and base 12 are now ready to be released from the vessel 14. It is however envisaged that the turbine 10 could be omitted from the base 12, and thus the base 12 would be lowered to the seabed B in isolation. The turbine 10 would then need to be suitably located on and fixed to the base 12.

The base 12 comprises a frame 16 which, in the embodiment illustrated, is capable of being secured on the underside of the vessel 14, the base 12 having three legs 17 extending downwardly from the frame 16. The base 12 further comprising a pair of supports 18 which project upwardly from the frame 16. The vessel 14 is adapted to allow the supports 18 to project upwardly through the vessel 14, onto which supports 18 the turbine 10 is suitably fixed. A number of winches 20, three in the embodiment illustrated, are provided on the vessel 14 and are secured to the frame 16 to be used to raise and lower the base 12 relative to the vessel 14. Locking means (not shown) are preferably provided on the base 12 and/or vessel 14 in order to allow the base 12 to be locked securely to the underside of the vessel 14. However the winches 20 may themselves double as this locking means.

Figure 2:
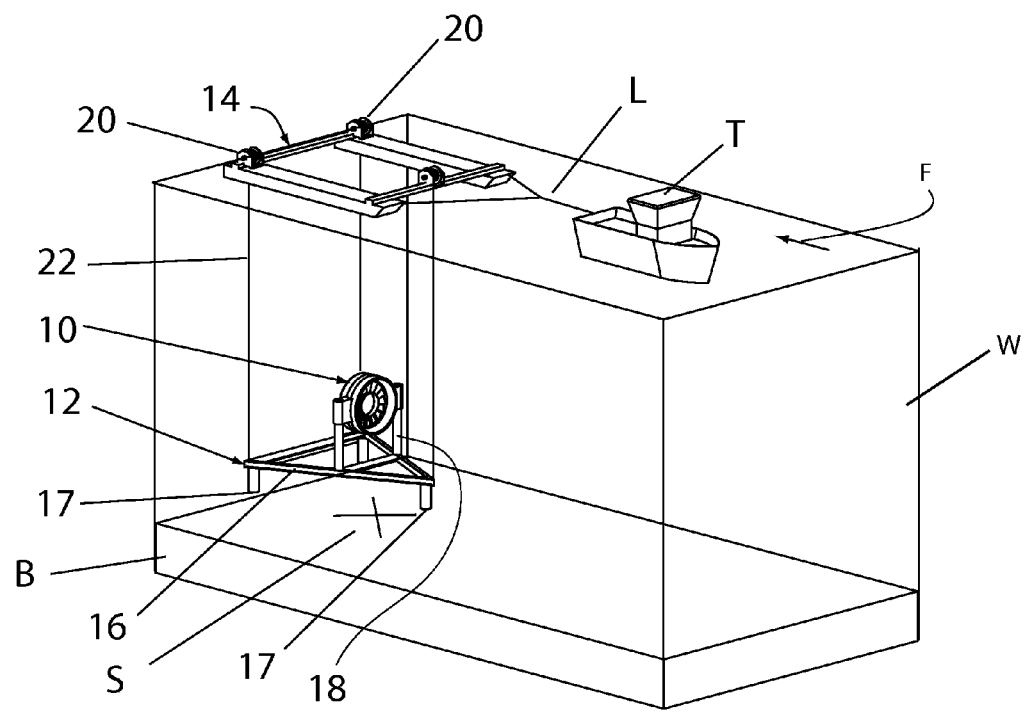
FIG. 2 illustrates the vessel of FIG. 1 lowering the base and turbine towards the seabed.

Referring to FIG. 2, once the vessel 14 is positioned over the site S the locking means (not shown) are released and the winches 20 can then be used to begin to lower the base 12 and turbine 10 towards the seabed B. In the embodiment illustrated the turbine 10 can pass directly through the vessel 14, thereby enabling the base 12 and turbine 10 to be lowered from directly beneath the vessel 14, providing significant stability during the lowering process. Each winch 20 feeds out a respective lowering line 22 connected to the base 12 in order to lower the base 12 towards the seabed B and in particular the installation site S. Conventionally when lowering such components from a marine vessel it is necessary to utilise a crane or similar boom based hoist (not shown) overhanging the side of the vessel. This type of arrangement is inherently less stable due to the moment of the crane and component suspended therefrom.

Once the base 12 is positioned close to the seabed B, without having contacted same, sensors (not shown) on the base 12 and/or turbine 10 are used to receive telemetry from the base 12. In particular it is preferable that the sensors (not shown) are adapted to provide video, location and depth information to persons co-ordinating the installation, and who are preferably located on the deployment vessel 14. Once this telemetric information is deemed within acceptable parameters, the base 12 can be fully lowered onto the seabed B. Again the sensors (not shown) will provide telemetry to indicate when the base 12 actually contacts the seabed B.

Figure 3:
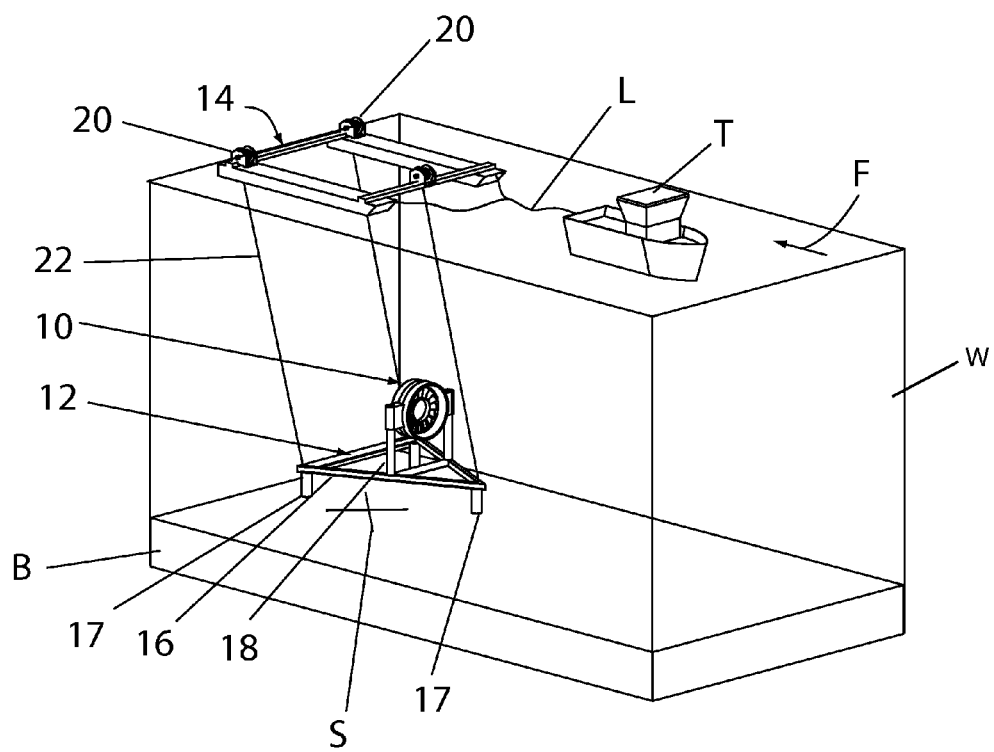
FIG. 3 illustrates the arrangement of FIGS. 1 and 2 following the location of the base and turbine on the seabed.

Referring to FIG. 3, the tug T now attempts to hold the deployment vessel 14 in position against the falling tide F while an additional length of lowering line 22 is unwound from each winch 20, for example an additional 5 m of line 22 is released. As a result of the slack on the lines 22 the base 12 will be firmly seated on the seabed B, and the tug T then eases out the towline L secured between the tug T and the vessel 14 to create slack in the towline L. This arrangement allows the base 12 to act as an anchor which is tethering the vessel 14 thereto. In this way the base 12 is allowed to sit on the seabed B entirely under the weight of the turbine 10 and base 12 while remaining connected to the vessel 14. If the turbine 10 and base 12 were then required to be raised off the seabed B for any reason the connection between the vessel 14 and the base 12 would simplify this process.

As there is now no external loading on the base 12 and turbine 10, the base 12 should be sitting stably on the seabed B. It is important, during this phase of the installation, that the tug T does not put any load on the towline L. At this point, telemetry is taken from the base 12 and studied to confirm how the base 12 is lying on the seabed B.

Figure 4:
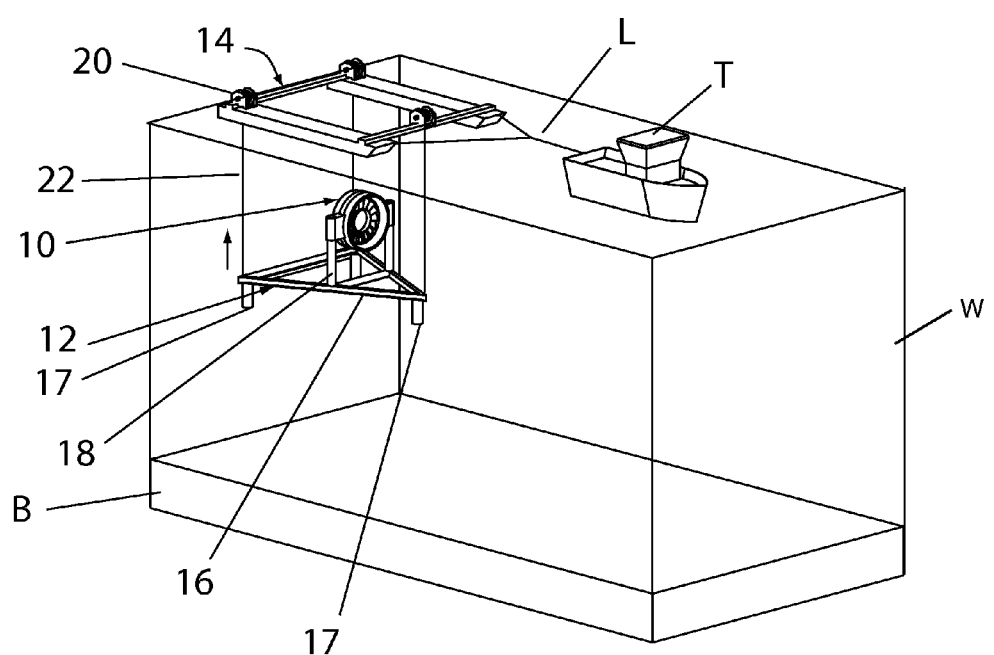
FIG. 4 illustrates the arrangement of FIG. 3 following the retraction of the base and turbine from the seabed.

Referring to FIG. 4, if the telemetry indicates that the base 12 is not sitting within agreed parameters, for example, location, direction, tilt, depth, etc, the base 12 and turbine 10 can be quickly and easily raised and re-positioned using the winches 20. The slack is taken up from the lowering lines 22 and the winches 20 then used to draw the base 12 off the seabed B for re-positioning. During this process the tug T is again used to hold the position of the vessel 14 steady against the falling tide. Once the base 12 has been lifted, the tug T can be used to move the vessel 14 to a new location, at which the base 12 can be re-positioned on the seabed B as hereinbefore described. If during the positioning of the base 12 it is not possible to complete the installation within the available window or to the agreed parameters, the base 12 and turbine 10 can be fully raised back into position and connected to the vessel 14 to be towed back to harbour.

In a preferred arrangement the base 12 is lowered such that the front leg 17 contacts the seabed B before the rear two legs 17. This is achieved by feeding slightly more lowering line 22 from the font winch 20. Once the front leg 17 contacts the seabed B it can be used as a pivot on which the base 12 can be rotated in order to allow the orientation of the base 12 to be varied. By moving the vessel 14 the orientation of the base 12 can be corrected, and once done the rear two legs 17 can then be lowered onto the seabed B.

Figure 5:
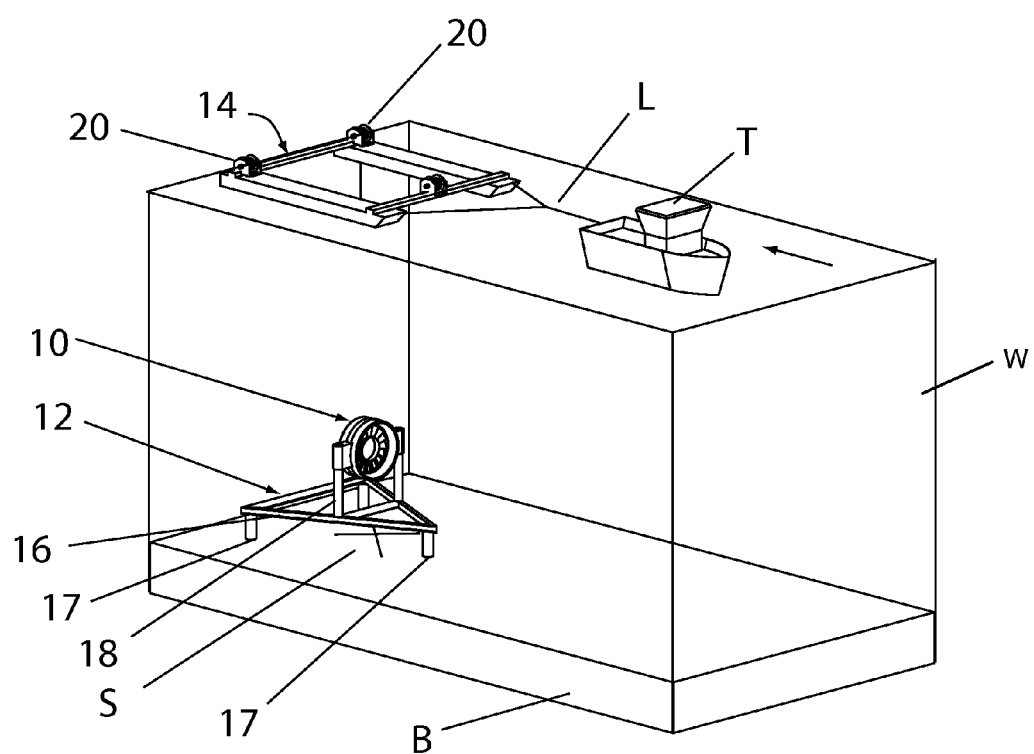
FIG. 5 illustrates the base and turbine having been released from the deployment vessel to begin operation.

Referring to FIG. 5, provided that the base 12 is sitting on the seabed B within agreed parameters, each of the lowering lines 22 can be disconnected from between the base 12 and the vessel 14 thereby leaving the base 12 and turbine 10 located at the deployment site S to begin operation. The tug T can then tow the empty vessel 14 back to harbour.

The above installation method may be modified by using an anchor (not shown) to stabilise the base 12 during lowering onto the seabed B. In particular, the anchor would be laid on the seabed upstream of the installation site, and would preferably be provided with a buoy tethered thereto to enable the base 12 to be connected to the anchor while secured to the vessel 14. Once the vessel is positioned over the deployment site, the base is tied to the anchor, for example by the front leg 17. Thus as the base 12 is lowered towards the seabed B the anchor, being upstream of the base 12, will help to maintain the correct orientation of the base 12.

The present invention therefore provides a method for installing a hydroelectric turbine 10 and base 12 onto the seabed B which enables the installation to be checked before disconnecting the deployment vessel 14.

The invention claimed is:

1. A method of installing a base and a hydroelectric turbine onto the seabed, the method comprising the steps of:
   connecting the turbine to the base;
   securing the turbine and base to an underside of a deployment vessel;
   said method further comprising sequentially
   transporting the base and turbine to a deployment site with the deployment vessel;
   lowering the base onto the seabed from a position secured directly beneath the underside of the vessel;
   keeping the vessel tethered to the base;
   establishing the suitability of the installation; and
   disconnecting the vessel from the base.

2. The method according to claim 1 comprising lowering the base by means of a plurality of lowering lines fed from the deployment vessel.

3. The method according to claim 2 comprising the step of feeding slack into the plurality of lowering lines once the base is located on the seabed.

4. The method according to claim 1 comprising lowering the base onto the seabed in flowing water.

5. The method according to claim 1 comprising lowering the base onto the seabed in a tidal stream, an ocean current or a running river.

6. The method according to claim 4 comprising the step of substantially maintaining a position of the deployment vessel against the flowing water.

7. The method according to claim 1 comprising the step of receiving telemetry from at least one of the base and turbine prior to a final positioning of the base on the seabed.

8. The method according to claim 1, wherein the transporting step comprises towing the deployment vessel to the deployment site.

9. The method according to claim 8 comprising the step of slackening a tow-line between a towing vessel and the deployment vessel following slackening of lowering lines between the deployment vessel and the base.

10. The method according to claim 1 comprising, in the step of establishing the suitability of the installation, receiving telemetry from at least one of the base and turbine when on the seabed.

11. The method according to claim 1 comprising the further step of at least partially raising the base off the seabed and repositioning the base prior to disconnecting the vessel from the base.

12. A method of installing a base and a hydroelectric turbine onto the seabed, the method comprising the steps of:
   connecting the turbine to the base;
   securing the turbine and base to an underside of a deployment vessel;
   said method further comprising sequentially
   transporting the base and turbine to a deployment site with the deployment vessel;
   lowering the base onto the seabed from the position secured directly beneath the underside of the vessel by means of a plurality of lowering lines fed from the deployment vessel;
   feeding slack into the plurality of lowering lines once the base is located on the seabed;
   keeping the vessel tethered to the base after the step of lowering the base onto the seabed;
   establishing the suitability of the installation of the base on the seabed;
   in the step of establishing the suitability of the installation, receiving telemetry from at least one of the base and turbine when on the seabed; and
   disconnecting the vessel from the base after the step of establishing the suitability of the installation.

\* \* \* \* \*